United States Patent [19]

Dixon et al.

[11] 4,248,668
[45] Feb. 3, 1981

[54] STORAGE MODULE FOR NUCLEAR FUEL ASSEMBLIES

[75] Inventors: Robert C. Dixon, Morgan Hill; Walter A. Graf, Jr., Saratoga; David R. Sponseller, San Jose, all of Calif.

[73] Assignee: General Electric Company, San Jose, Calif.

[21] Appl. No.: 886,154

[22] Filed: Mar. 13, 1978

[51] Int. Cl.$^2$ .................. G21C 19/20; G21F 5/00
[52] U.S. Cl. .................................. 176/30; 250/507
[58] Field of Search .......................... 176/30, 87, 50; 250/506, 507, 515, 518

[56] References Cited

U.S. PATENT DOCUMENTS

| | | | |
|---|---|---|---|
| 3,166,481 | 1/1965 | Braun | 176/50 |
| 3,859,533 | 1/1975 | Suvanto | 250/507 |
| 4,006,362 | 2/1977 | Mollon | 250/518 |
| 4,010,375 | 3/1977 | Wachter | 250/507 |
| 4,034,227 | 7/1977 | Soot | 250/507 |
| 4,088,897 | 5/1978 | Soot | 250/507 |

FOREIGN PATENT DOCUMENTS

| | | | |
|---|---|---|---|
| 2604863 | 9/1976 | Fed. Rep. of Germany | 176/30 |
| 2701137 | 8/1977 | Fed. Rep. of Germany | 176/30 |

Primary Examiner—Samuel W. Engle
Assistant Examiner—Donald P. Walsh
Attorney, Agent, or Firm—Ivor J. James; Samuel E. Turner; Sam E. Laub

[57] ABSTRACT

A storage module or rack is disclosed for storage of nuclear fuel assemblies in a water-filled pool comprising an array of storage tubes arranged in a checkerboard pattern and attached to one another along their corners. Each tube thus forms a storage cell for a fuel assembly and the spaces between each four adjacent tubes form intermediate fuel assembly storage cells. The storage tubes are formed with spaced double walls between which is contained a layer of neutron absorbing material to assure that the array of stored fuel assemblies remains subcritical. Provision is made for free circulation of water through the storage cells to extract heat from the stored assemblies. The storage module maximizes the number of fuel assemblies that can be stored in a given space while minimizing the material used in its construction.

10 Claims, 9 Drawing Figures

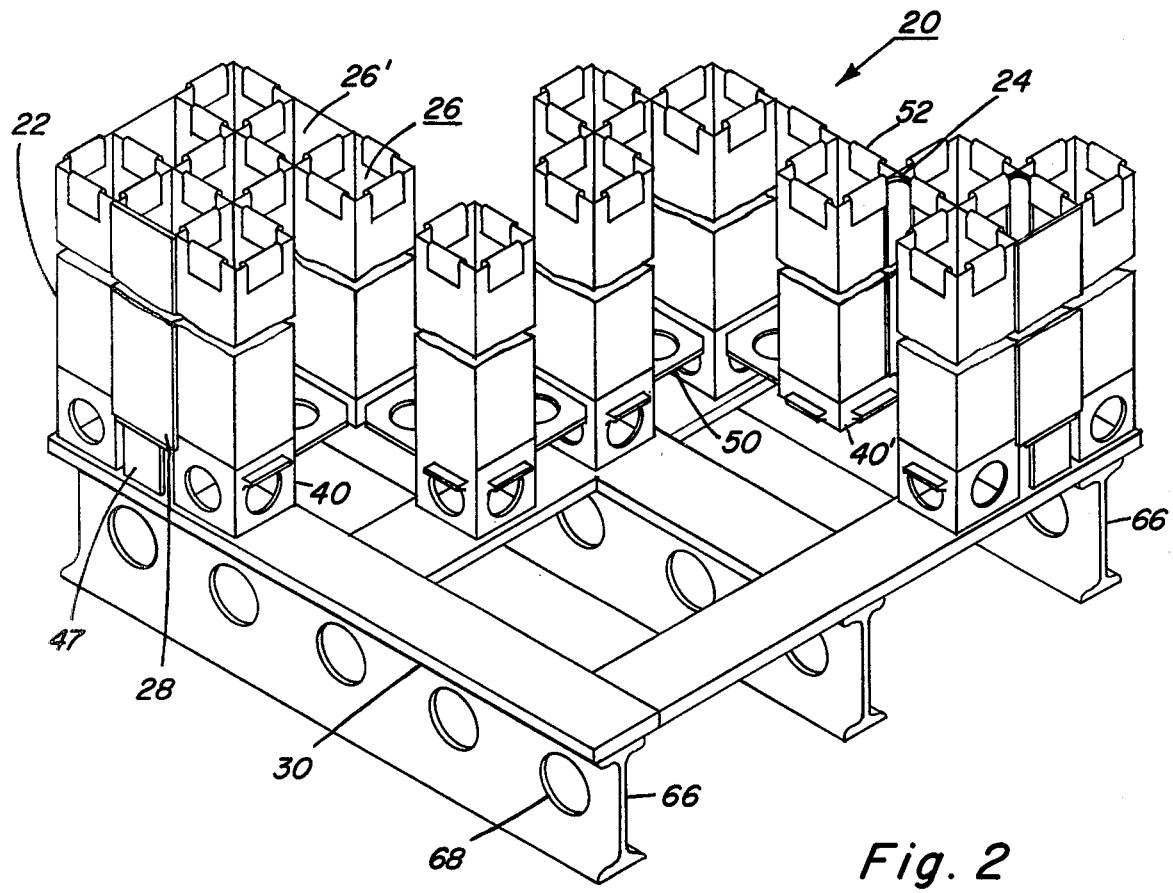
Fig. 2
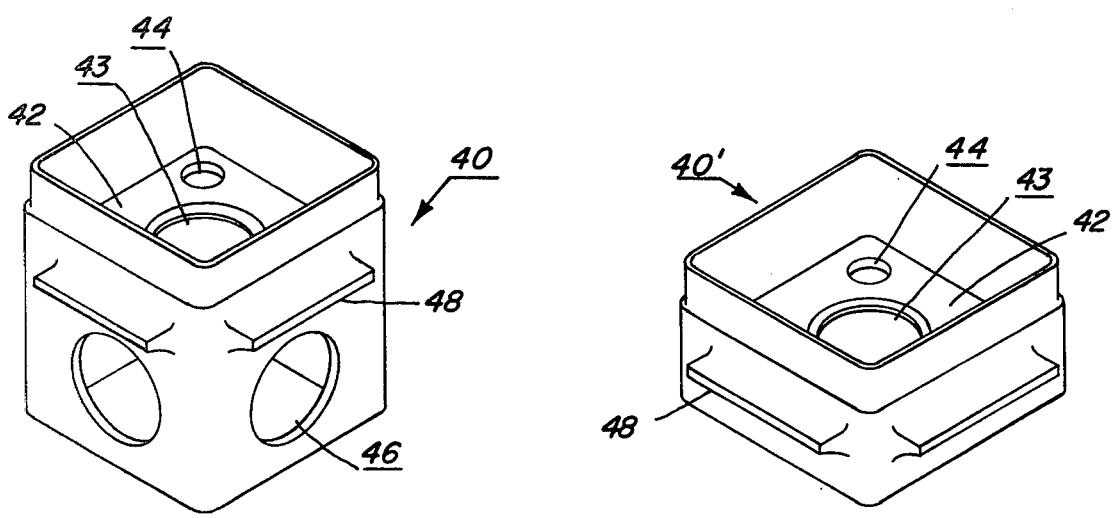
Fig. 4A
Fig. 4B

STORAGE MODULE FOR NUCLEAR FUEL ASSEMBLIES

BACKGROUND

In known types of nuclear reactors the reactor core comprises a plurality of individually removable fuel assemblies arranged in an array capable of self sustained nuclear fission reaction. Each such removable fuel assembly typically comprises an array of elongated, cladded fuel elements or rods containing suitable fuel material, such as uranium oxide or plutonium oxide, or both, supported in spaced relation between upper and lower tie plates. A typical fuel assembly of this type is shown, for example, by B. A. Smith, et al in U.S. Pat. No. 3,689,358. An example of a fuel element or rod is shown in U.S. Pat. No. 3,378,458.

Additional information on nuclear power reactors may be found, for example, in "Nuclear Power Engineering", M. M. El-Wakil, McGraw-Hill Book Company, Inc., 1962.

To maintain operation, nuclear reactors typically are refueled on a periodic basis. That is, the reactor is periodically shut down and a portion of the fuel assemblies is removed from the core and is replaced with fresh fuel assemblies. The irradiated or spent fuel assemblies removed from the core must be stored for an indefinite, extended length of time for decay of radioactivity and heat liberation therefrom and until they can be removed for reprocessing or other disposition.

It is well known to store such fuel assemblies at a sufficient depth in a water-filled storage pool to provide radiation shielding, the water also acting as a coolant. In the past the fuel assemblies were widely spaced from one another in the pool to avoid the possibility of a critical array. The resulting low fuel assembly densities and storage capacities are found inadequate for current storage needs.

Various storage racks and storing devices have been proposed for reducing the substantial spacing between fuel assemblies in a storage pool. U.S. Pat. No. 4,010,375 discloses a rack for storage of spent nuclear fuel assemblies. The rack consists of an array of storage cells containing the fuel assemblies and interspersed between the cells are poison boxes consisting of water-filled enclosures having walls incorporating a neutron-absorbing material. The poison boxes function as neutron traps, and the storage cells and poison boxes are arranged in such a manner that each poison box is immediately adjacent at least one storage cell and adjacent storage cells are in contact on at least one side of each cell.

U.S. Pat. No. 3,859,533 describes a storing device for fuel assemblies comprising a supporting grid with a substantially square lattice and a plurality of tubes of substantially square cross section with each tube being adapted to contain one fuel element. Retaining devices are provided for holding the tubes in position with respect to the grid. The walls of each tube are coated with neutron absorbing material. Each of the retaining devices is arranged to support the walls of adjacent tubes in spaced relation to provide a gap between them. The gap contains a layer of neutron absorbing material.

Components for use in storage racks and devices have also been proposed. U.S. Pat. No. 4,006,362 discloses a generally tubular shroud of rectangular cross section having flat side walls formed by inner and outer tubes of rectangular cross section spaced apart to provide a substantially uniform space therebetween. An aluminum-boron carbide sandwich is positioned in and substantially fills the spaces at the four sides of the shroud. The inner and outer tubes and the sandwiches are interlocked by outwardly extending protrusions or dimples formed in the shroud walls.

German Patent Application No. 2,604,863, published for inspection on Sept. 23, 1976, describes a device for safe, and at the same time, space-saving storage of a plurality of fissionable masses, in which each mass is separated from the neighboring mass by means of a neutron-absorbing shield, an interstice filled with a moderating substance and a further neutron-absorbing shield. The device is characterized in that all shields surrounding one mass are connected with one another by means of spacers which define a predetermined minimum neutron moderating distance.

It has remained desirable to provide a storage rack for the storage of nuclear fuel assemblies that can be constructed inexpensively, is comprised of a minimum number of component parts, is easily fabricated and which maximizes the storage density.

It is therefore an object of the invention to provide a storage module for nuclear fuel assemblies which maximizes the number of assemblies that can be stored in a given space and minimizes the material used in construction.

SUMMARY

The storage module or rack of the invention comprises an array of storage tubes each dimensioned to provide a storage cell for a single fuel assembly. The tubes are arranged in a checkerboard pattern with adjacent tubes attached to each other along their corners such that the exterior walls of each four adjacent tubes form the interior walls of additional or intermediate storage cells without the need of a tube at each fuel assembly storage cell position. That is, for a given number of storage tubes, approximately twice the number of fuel assembly storage cells are provided.

Each storage tube includes an individual base portion, separate from the base portion of any other of the tubes, designed to provide for coolant flow vertically through the storage cells and to support the fuel assembly therein. These base portions also provide support for separate fuel assembly support plates positioned in the intermediate storage cells.

By providing each of the storage tubes with individual fuel assembly support base portions, which also support separate fuel assembly support plates in the intermediate storage cells, any reasonable number of the tubes and support plates can be assembled into a module of a size to fit the available storage pool space without the necessity of fabricating a specially sized base plate common to all of the storage cells or limitation to a particular size of common base plate.

To assure that the array of stored fuel assemblies remains subcritical, each of the walls of each of the tubes includes a layer of neutron absorbing material.

DRAWING

FIG. 2 is a partial isometric view of the storage module also illustrating one embodiment of a module support base;

FIGS. 4A and 4B are isometric views of base portions of the storage tubes;

DESCRIPTION

Figure 1:
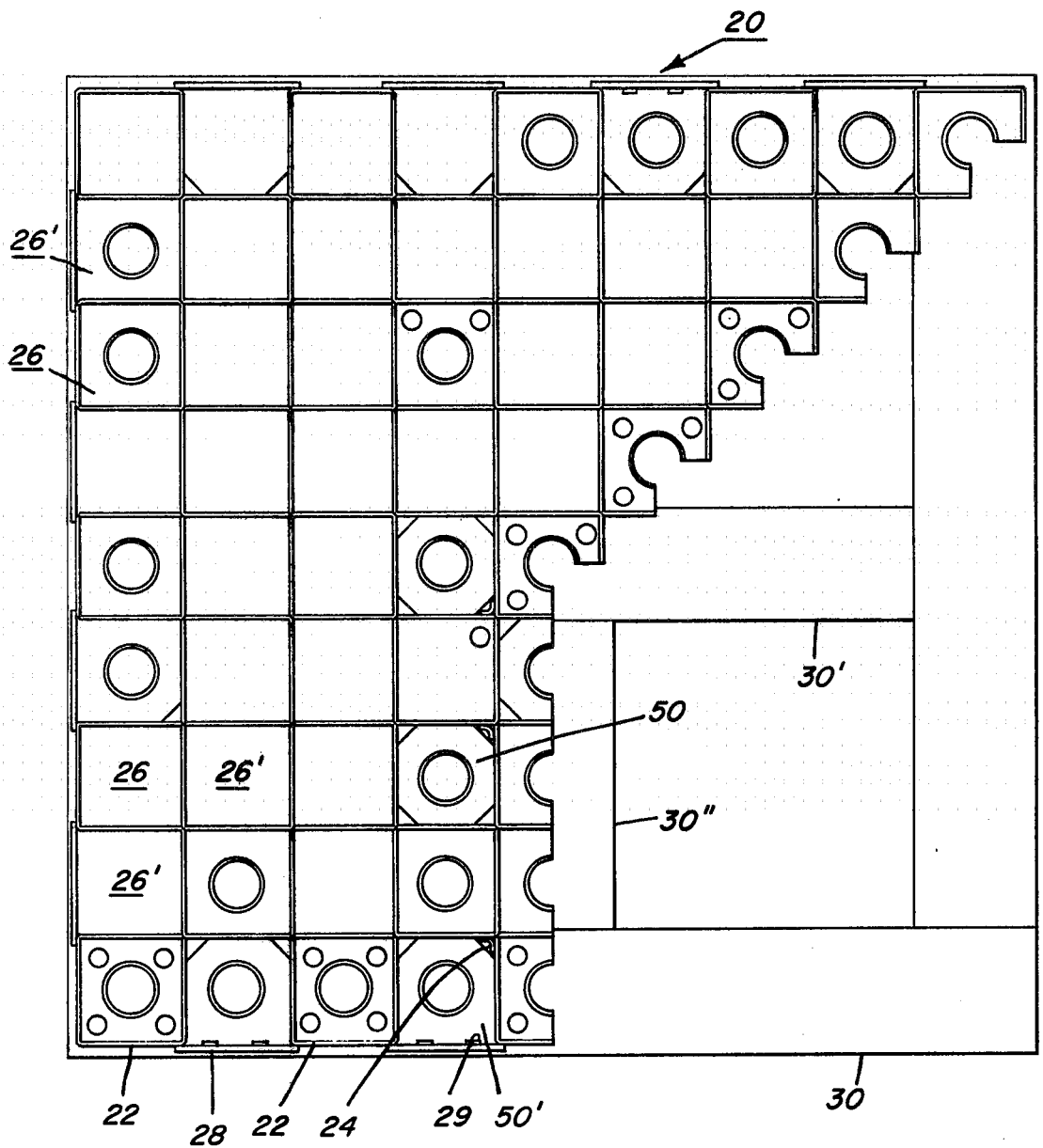
FIG. 1 is a plan view of a storage module according to the invention with a portion cut away to illustrate the support rails.

Illustrated in FIGS. 1 and 2 is a storage module 20 comprising an array of storage tubes 22 of generally rectangular (e.g. square) cross section. The tubes 22 are arranged in a checkerboard pattern with abutting corners secured together, as by welding, and preferably reinforced by angles 24. Thus the tubes 22 provide a plurality of fuel assembly storage cells 26 while the spaces between each adjacent four of the tubes 22 provide a plurality of intermediate storage cells 26', the gaps between adjacent ones of the peripheral tubes 22 being closed by closure plates 28 to enclose the peripheral intermediate storage cells. A pair of spaced, elongated, vertically oriented shim plates 29 may be secured to the inside surface of closure plate 28 to reduce the effective transverse dimension of the peripheral intermediate storage cells, thus making the peripheral intermediate storage cells approximately equal in size to the other storage cells.

The array of tubes 22 is secured to a system of base rails which, as illustrated in FIGS. 1 and 2, comprises a peripheral rail 30 and cross rails 30' and 30".

Figure 3:
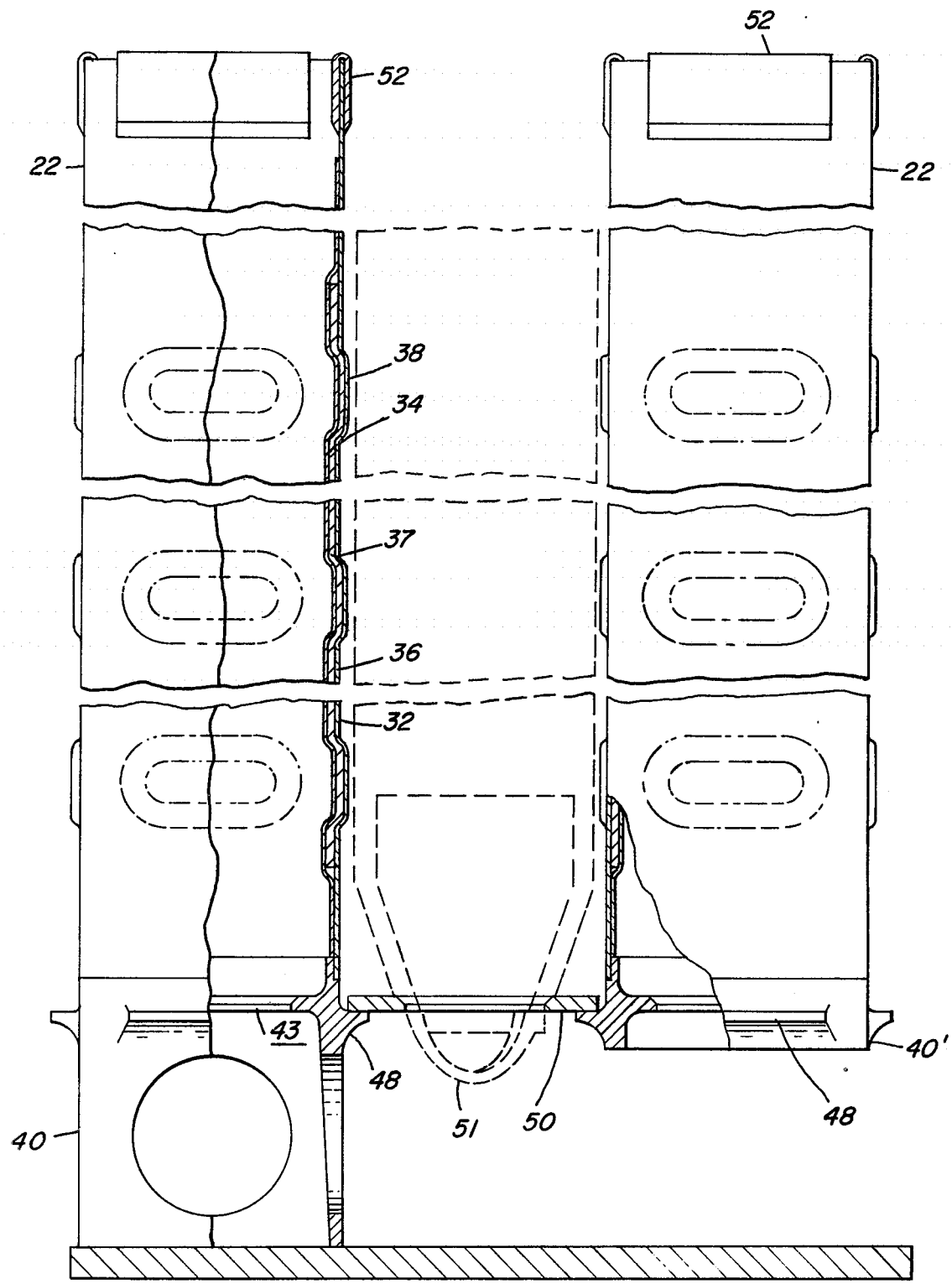
FIG. 3 is a partly cut away elevation view of two adjacent storage tubes.

The storage tubes 22 are shown in greater detail in FIG. 3. The storage tubes 22 include a composite or sandwich portion 32 formed by an inner wall 34 and an outer wall 36 between which is contained a layer 37 of neutron absorbing material such as a boron carbide-aluminum matrix. To add mechanical stability and rigidity the sandwich portions 32 are preferably formed with a plurality of vertically spaced, outwardly deformed portions or dimples 38. Further details of the construction and method of making such composite tubes can be found in U.S. Pat. No. 4,006,362.

Each storage tube 22 includes a base portion of one of two different types, a long base 40 or a short base 40' as shown in FIGS. 3, 4A and 4B. These bases are preferably castings and they are secured to the outer wall 36 of the tubes as by welding. Each base 40 and 40' includes a support plate 42 having a central aperture 43 sized to receive the nose piece of a fuel assembly by which the fuel assembly is supported in the storage tube. A plurality of holes 44 may be provided to enhance coolant flow through the storage tube.

Long bases 40 are fitted to the storage tubes 22 which are located over and secured to the base rails 30, 30' and 30" (see FIG. 2). To provide coolant flow through such storage tubes the long bases 40 are formed with relatively large side apertures or holes 46. Short bases 40' are fitted to the storage tubes 22 which are not located over the base rails.

As shown in FIG. 2, spaces between the bases 40 around the periphery of the module are closed with lower closure plates 47.

Figure 5A:
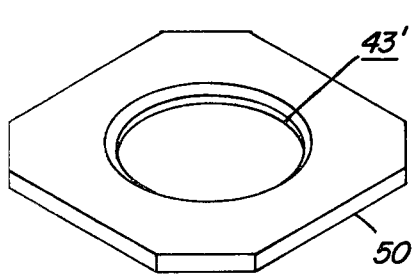
FIGS. 5A and 5B are isometric views of embodiments of fuel assembly support plates.
Figure 5B:
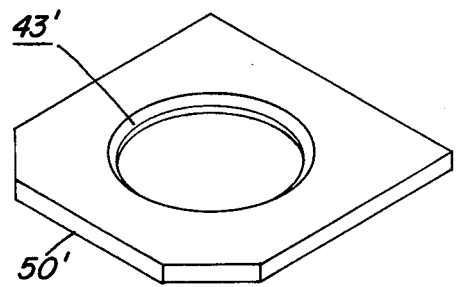

Each of the bases 40 and 40' is formed with outwardly extending lips 48. Secured to the lips 48 (as by welding) are fuel assembly support plates 50 or 50' in the intermediate storage cells 26'. Support plates 50 and 50', as illustrated in FIGS. 5A and 5B are formed with cut off corners to enhance coolant flow through the intermediate storage cells and with a chamfered central aperture or hole 43' sized to receive the nose piece of a fuel assembly by which the fuel assemblies are supported in the intermediate storage cells. (Such a fuel assembly nose piece 51 is shown by dashed lines in FIG. 3.) As can be seen in FIG. 1, the support plate 50' is used in the peripheral intermediate storage cells while the plate 50 is used in the other intermediate cells.

To protect the tubes 22 from possible damage attendant the insertion and removal of fuel assemblies, the top ends of the tubes 22 are provided with generally U-shaped protection guides 52 fitted over and secured to the top end of the outer wall 36 of the tube 22.

Figure 6:
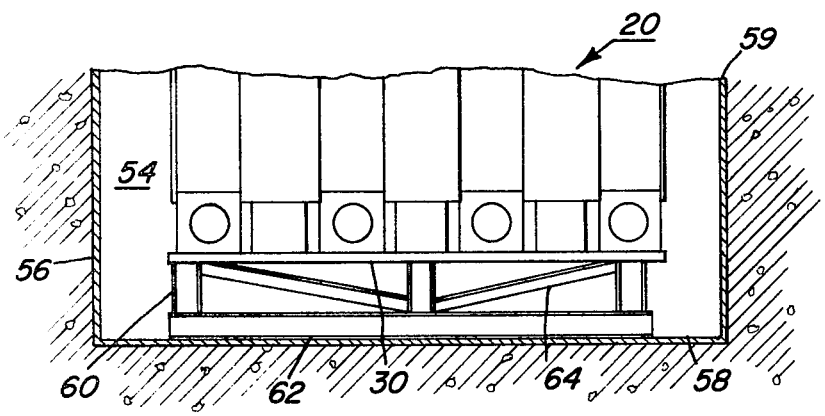
FIG. 6 is an elevation view of a module support base arrangement.

To allow coolant flow under the module 20 and thence upward through the storage cells thereof, the module must be supported above the floor of the coolant pool. Various embodiments of support bases are feasible depending upon, among other things, seismic considerations. As illustrated in FIG. 6 the module 20 is submerged in a pool of coolant 54 (such as water), the pool being formed by side walls 56 and a floor 58 fitted with a stainless steel liner 59. The module 20 is supported above the floor 58 by a truss arrangement including vertical posts 60 (secured to the module rails 30, 30' and 30"), horizontal beams 62 and braces 64.

Another version of a module support base is shown in FIG. 2 wherein the module 20 is supported on a series of beams such as I-beams 66. Holes 68 may be formed in the webs of the I-beams to enhance coolant circulation.

Figure 7:
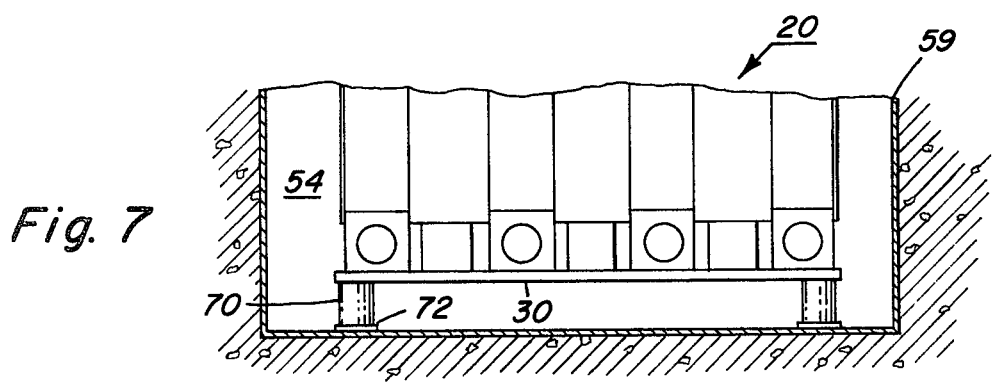
FIG. 7 is an elevation view of an alternate module support base arrangement.

Another version of a module support arrangement illustrated in FIG. 7 comprises a series of feet 70 (formed, for example, from short sections of pipe) secured at their upper ends to the module rails 30 and fitted at their lower ends with cap plates 72 which provide contact surfaces for support of the module on the pool floor.

In a particular embodiment of the module of the invention the module is a square array of 13×13 storage cells thus providing for storage of 169 fuel assemblies. Materials selected for construction of the components of the module should be appropriate to the environment. In general, stainless steel is a preferred material because of its resistance to corrosion and radiation damage.

What is claimed is:

1. A storage module for storage of nuclear fuel assemblies in a liquid pool comprising the combination of: an array of tubes of generally rectangular cross section arranged in a checkerboard pattern leaving gaps between tubes at the periphery of said array, adjacent ones of said tubes being attached to one another along their adjacent corners, each of said tubes including a respective individual base portion separate from the base portions of any other of the tubes providing for liquid flow therethrough and for support of a fuel assembly therein, each of said tubes having a composite portion attached to and extending upward from said base portion and including a layer of neutron absorbing material sandwiched between inner and outer walls thereof; respective individual fuel assembly support plates positioned in spaces not occupied by said tubes and supported by base portions of adjacent ones of said tubes; and closure plates attached between peripheral ones of said tubes to span said gaps.

2. The storage module of claim 1 wherein said tubes have a generally square cross section.

3. The combination of claim 1 wherein said module is supported in said pool on a support base which permits circulation of liquid under said module.

4. The combination of claim 3 wherein said module is restrained against lateral movement in said pool only by friction between said support base and the floor of said pool.

5. The storage module of claim 1 wherein said inner and outer walls of said composite portion are formed of stainless steel and wherein said neutron absorbing material comprises a boron carbide-aluminum matrix clad with aluminum.

6. The storage module of claim 1 wherein adjacent ones of said tubes are attached to one another by an angle member welded therebetween.

7. The storage module of claim 1 wherein the base portion of each tube and the support plates between said tubes are formed with a central opening to receive the nose piece of a fuel assembly.

8. The storage module of claim 1 wherein said tubes are fitted at their upper ends with generally U-shaped protection guides.

9. The storage module of claim 1 including a plurality of rails underlying predetermined ones of said tubes, the base portion of said predetermined ones of said tubes being elongated and attached to said rails and formed with apertures for allowing flow of said coolant through said tubes.

10. The combination of claim 9 including support means attached to said rails.

* * * * *